(12) United States Patent
Gokurakuji et al.

(10) Patent No.: US 8,539,058 B2
(45) Date of Patent: Sep. 17, 2013

(54) PROCESSING STATE MANAGEMENT DEVICE, PROCESSING STATE MANAGEMENT METHOD, AND PROGRAM

(75) Inventors: Junichi Gokurakuji, Tokyo (JP); Motohiro Suzuki, Tokyo (JP); Kaname Naito, Tokyo (JP); Motonobu Kimura, Tokyo (JP); Shuhei Miura, Tokyo (JP)

(73) Assignee: NEC Corporation, Tokyo (JP)

( * ) Notice: Subject to any disclaimer, the term of this patent is extended or adjusted under 35 U.S.C. 154(b) by 425 days.

(21) Appl. No.: 12/735,862

(22) PCT Filed: Feb. 5, 2009

(86) PCT No.: PCT/JP2009/051976
§ 371 (c)(1),
(2), (4) Date: Aug. 20, 2010

(87) PCT Pub. No.: WO2009/107468
PCT Pub. Date: Sep. 3, 2009

(65) Prior Publication Data
US 2011/0106928 A1 May 5, 2011

(30) Foreign Application Priority Data
Feb. 28, 2008 (JP) ................................ 2008-047600

(51) Int. Cl.
*G06F 15/173* (2006.01)
(52) U.S. Cl.
USPC ......................................... 709/223; 709/224

(58) Field of Classification Search
USPC .................................................. 709/223, 224
See application file for complete search history.

(56) References Cited

U.S. PATENT DOCUMENTS

| 2001/0018742 A1* | 8/2001 | Hirai ............................. 713/193 |
| 2004/0122700 A1* | 6/2004 | Aoki et al. ........................ 705/1 |
| 2005/0257045 A1* | 11/2005 | Bushman et al. ............. 713/156 |
| 2006/0224775 A1* | 10/2006 | Lee et al. ...................... 709/248 |

FOREIGN PATENT DOCUMENTS

| JP | 62-247430 | 10/1987 |
| JP | 9-62559 | 3/1997 |
| JP | 11-15786 | 1/1999 |
| JP | 2003-288301 | 10/2003 |
| JP | 2005-92467 | 4/2005 |
| JP | 2006-244146 | 9/2006 |

* cited by examiner

*Primary Examiner* — Mohamed Wasel
(74) *Attorney, Agent, or Firm* — McGinn IP Law Group, PLLC

(57) ABSTRACT

A processing state management apparatus to be connected to a distribution server that carries out a transaction to register or delete content to be distributed, includes a transmitter which transmits a request requesting the distribution server to carry out the transaction, and a state updater which, after the processing state management apparatus has requested the distribution server to carry out the transaction, holds state information indicative of the state of the transaction in the distribution server as representing processing in progress until the processing state management apparatus receives a notification of completion of the transaction from the distribution server.

26 Claims, 17 Drawing Sheets

CONTENTS REGISTRATION ACCORDING TO FTP

Fig.10

| contents identification information | STATE INFORMATION |
|---|---|
| A-5520 | REGISTRATION IN PROGRESS |
| B-0156 | DELETION IN PROGRESS |
| C-5443 | REGISTRATION IN PROGRESS |
| D-4043 | REGISTRATION IN PROGRESS |

PROCESSING STATE MANAGEMENT DEVICE, PROCESSING STATE MANAGEMENT METHOD, AND PROGRAM

TECHNICAL FIELD

The present invention relates to a processing state management apparatus, a processing state management method, and a program for managing registration states of various contents such as audio data, still images, and moving images that are to be distributed.

BACKGROUND ART

In recent years, the content distribution technology for distributing various content such as audio data, still images, and moving images has seen quick widespread use. The content distribution technology makes it possible for users to obtain desired contents via a network without having to carry transportable storage mediums.

FIG. 1 is a diagram showing one form of a general content distribution system.

The content distribution system shown in FIG. 1 comprises distribution server 1002 for distributing content, processing state management apparatus 1001 for managing processing states in distribution server 1002, and FTP server 1004 for storing various content, which are interconnected by network 1003.

Distribution server 1002 comprises distribution controller 1021, registration/deletion command controller 1022, state management controller 1023, content DB 1025 serving as a database for storing distributed content, and state DB 1024 serving as a database for storing registered/deleted states of content stored in contents DB 1025.

Distribution controller 1021 controls the distribution of content stored in content DB 1025.

Registration/deletion command controller 1022 controls the registration of content in contents DB 1025 and the deletion of content from content DB 1025 based on content registration/deletion requests sent from processing state management apparatus 1001.

State management controller 1023 stores the states of content registered/deleted by registration/deletion command controller 1022 into state DB 1024.

Processing state management apparatus 1001 comprises registration/deletion command controller 1011, state confirmation command controller 1012, state management controller 1013, and state DB 1014.

Registration/deletion command controller 1011 controls commands for sending requests to register/delete content to distribution server 1002.

State confirmation command controller 1012 controls commands for confirming the states of content stored in distribution server 1002 with distribution server 1002.

State management controller 1013 controls state DB 1014 which has stored the states of content acquired from distribution server 1002, according to the commands controlled by state confirmation command controller 1012.

FIG. 2 is a sequence diagram illustrative of a processing state management method in the content distribution system shown in FIG. 1.

When a content registration/deletion request generated by registration/deletion command controller 1011 is sent from processing state management apparatus 1001 through network 1003 to distribution server 1002 in step 91, registration/deletion command controller 1022 registers content, which is addressed by the content registration/deletion request, in content DB 1025 or deletes the content from content DB 1025, based on the content registration/deletion request that is sent. At this time, the content is acquired from FTP server 1004 or from a client terminal (not shown) which stores the content, and is registered in content DB 1025. The state of the registration/deletion of the content is stored in state DB 1024 by state management controller 1023.

While the content is being registered/deleted, in order for processing state management apparatus 1001 to confirm the progress of the registration/deletion of the content in distribution server 1002, a content registration/deletion state confirmation request for requesting the confirmation of the state of the registration/deletion of the content is generated by state confirmation command controller 1012 and sent via network 1003 to distribution server 1002 in step 92.

When the content registration/deletion state confirmation request is received by distribution server 1002, state management controller 1023 reads the state of the registration/deletion of the content from state DB 1024, and sends the read state of the registration/deletion of the content as a content registration/deletion state confirmation response via network 1003 to processing state management apparatus 1001 in step 93.

Thereafter, when registration/deletion command controller 1022 completes the registration of the content, which is addressed by the content registration/deletion request, into content DB 1025 or the deletion of the content from contents DB 1025, registration/deletion command controller 1022 sends a content registration/deletion completion response via network 1003 to processing state management apparatus 1001 in step 94. Even after the completion of a registration/deletion transaction in steps 91 through 94 is completed, processing state management apparatus 1001 sends a contents registration/deletion state confirmation request and distribution server 1002 sends a content registration/deletion state confirmation response in steps 95, 96.

FIG. 3 is a diagram showing an example of state information stored in state DB 1024 shown in FIG. 1.

As shown in FIG. 3, the state information stored in state DB 1024 represents contents registration/deletion states in distribution server 1002 based on content registration/deletion requests sent from processing state management apparatus 1001.

Before content is registered in distribution server 1002, state DB 1024 stores content state information representing "NO CONTENT". When a content registration request is sent from processing state management apparatus 1001, the content state information stored in state DB 1024 is changed from "NO CONTENT" to "REGISTRATION IN PROGRESS". When the registration of the content in content DB 1025 is completed in distribution server 1002, the content state information stored in state DB 1024 is changed from "REGISTRATION IN PROGRESS" to "CONTENT PRESENT".

When a content deletion request is subsequently sent from processing state management apparatus 1001, the content state information stored in state DB 1024 is changed from "CONTENT PRESENT" to "DELETION IN PROGRESS". When the deletion of the content from content DB 1025 is completed in distribution server 1002, the content state information stored in state DB 1024 is changed from "DELETION IN PROGRESS" to "NO CONTENT".

A content registration/deletion state confirmation request from processing state management apparatus 1001 is made at constant time periods both while a transaction is being carried out and while a transaction is not being carried out until the registration/deletion of the content is completed. Each time a content registration/deletion state confirmation request is made, state management controller 1023 reads the state of the registration/deletion of the content from state DB 1024, and sends the read state of the registration/deletion of the content as a content registration/deletion state confirmation response via network 1003 to processing state management apparatus 1001. When the state of the registration/deletion of the content is sent as a content registration/deletion state confirmation response via network 1003 to processing state management apparatus 1001, the sent state of the registration/deletion of the content is stored in state DB 1014 by state management controller 1013.

In this manner, a content registration/deletion state confirmation request is sent from processing state management apparatus 1001 to distribution server 1002 irrespective of whether or not a transaction is being carried out. Each time a content registration/deletion state confirmation request is sent to distribution server 1002, distribution server 1002 makes an inquiry to state DB 1024 about the state of the content, and sends a content registration/deletion state confirmation response to processing state management apparatus 1001. As the quantity of content increases, the processing load on distribution server 1002 increases, tending to cause a delay due to congestion.

In order to avoid congestion due to the processing load, there has been proposed a technology for holding other processes while a certain instruction is being carried out (see, for example, JP No. 2005-92467A).

With general processing state management apparatus 1001 shown in FIG. 1, however, a content registration/deletion state confirmation request is sent to distribution server 1002, and each time a result is received, the state of the content needs to be registered in state DB 1014. Consequently, as the quantity of contents increases, the amount of data required to be held by processing state management apparatus 1001 is likely to increase.

According to another example, distribution server 1002 may not manage content states. However, this example needs to have a means by which processing state management apparatus 1001 can make an inquiry about the state of information to distribution server 1002.

The technology disclosed in JP No. 2005-92467A is problematic in that the total processing load is not reduced because the other processes that have been held will subsequently be carried out when the processing of the certain instruction is completed.

DISCLOSURE OF THE INVENTION

It is an object of the present invention to provide a processing state management apparatus, a processing state management method, and a program which will solve the above problems.

To achieve the above object, there is provided in accordance with the present invention a processing state management apparatus to be connected to a distribution server that carries out a transaction to register or delete content to be distributed, said processing state management apparatus requesting said distribution server to carry out said transaction and managing the state of said transaction, wherein said processing state management apparatus holds state information indicative of the state of the transaction in said distribution server as representing processing in progress, after said processing state management apparatus has requested said distribution server to carry out said transaction until said processing state management apparatus receives a notification of completion of said transaction from said distribution server.

There is also provided a processing state management method that manages the state of a transaction in which a distribution server is requested to carry out registering or deleting content to be distributed, comprising:

generating a request signal to request said distribution server to carry out said transaction;

sending said request signal to said distribution server; and holding state information indicative of the state of the transaction in said distribution server as representing processing in progress after said request signal has been sent to said distribution server until a notification of completion of said transaction is received from said distribution server.

There is also provided a program that enables a processing state management apparatus which manages the state of a transaction in which a distribution server is requested to carry out registering or deleting content to be distributed, to execute:

a sequence to generate a request signal to request said distribution server to carry out said transaction;

a sequence to send said request signal to said distribution server; and a sequence to hold state information indicative of the state of the transaction in said distribution server as representing processing in progress after said request signal has been sent to said distribution server until a notification of completion of said transaction is received from said distribution server.

According to the present invention, as described above, since the state information indicative of the state of the transaction in the distribution server is held as representing processing in progress in the processing state management apparatus after the processing state management apparatus which is connected to the distribution server has requested the distribution server, which carries out a transaction to register or delete a content to be distributed, to carry out the transaction until the processing state management apparatus receives a notification of completion of the transaction from the distribution server, the processing state management apparatus is capable of easily managing the processing state in the distribution server without imposing a burden on the distribution server.

BRIEF DESCRIPTION OF THE DRAWINGS

FIG. 10 is a diagram showing an example of an internal configuration of a state DB shown in FIG. 9;

BEST MODE FOR CARRYING OUT THE INVENTION

Exemplary embodiments of the present invention will be described below with reference to the drawings.
(First Exemplary Embodiment)

Figure 1:
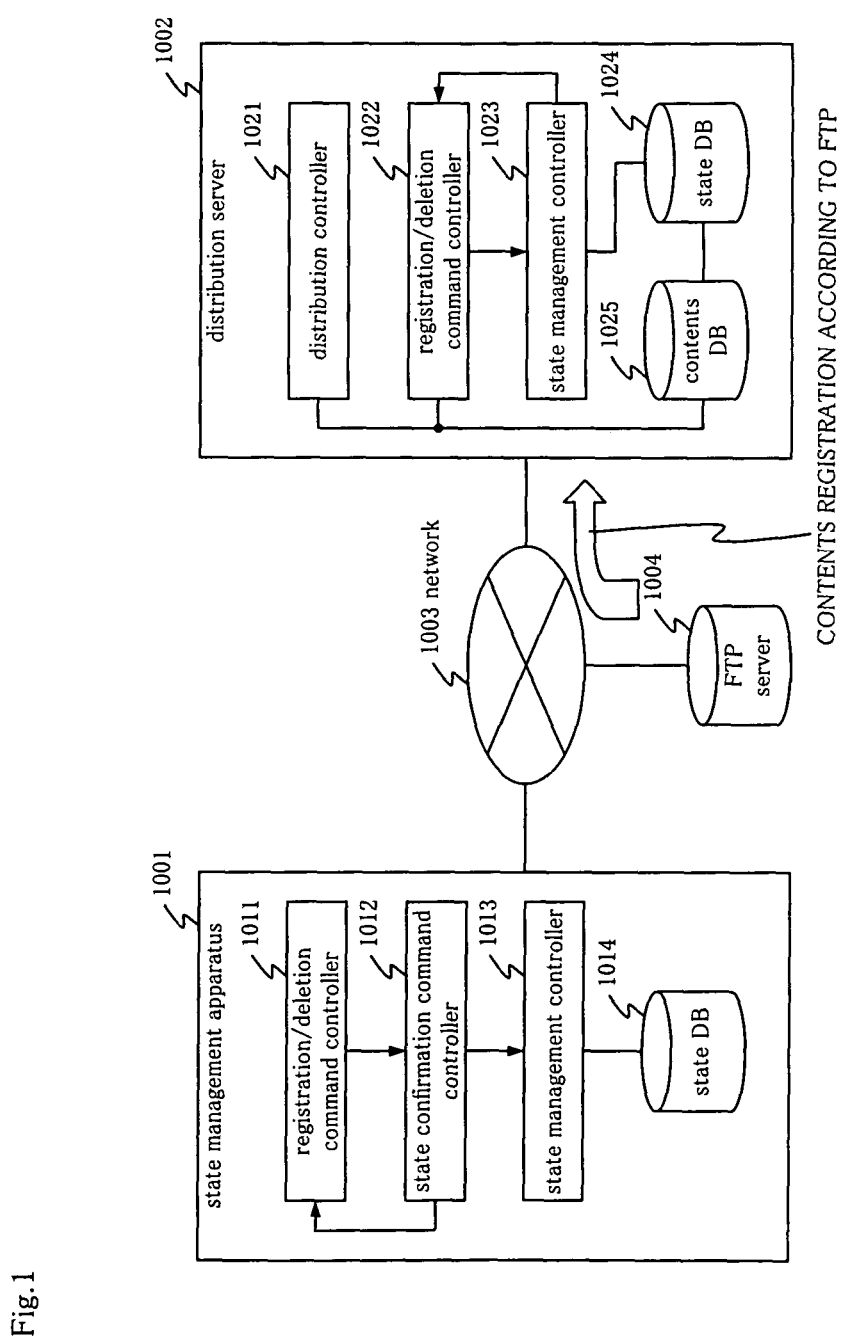
FIG. 1 is a diagram showing one form of a general content distribution system.
Figure 2:
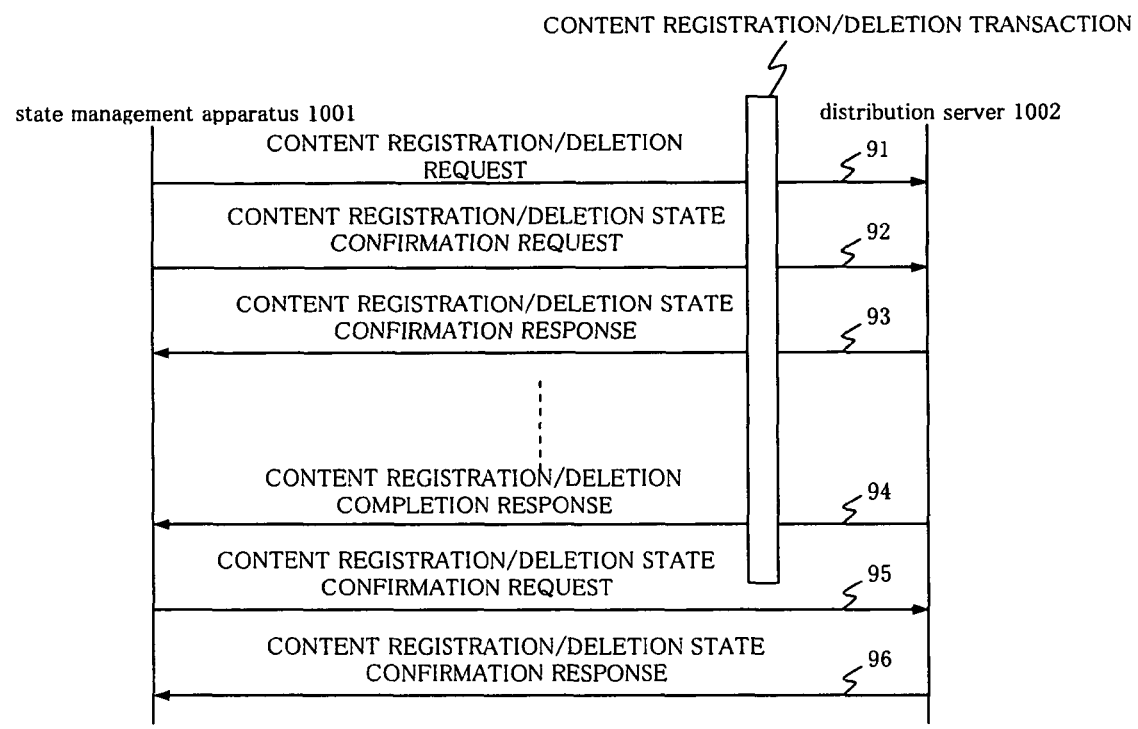
FIG. 2 is a sequence diagram illustrative of a processing state management method in the content distribution system shown in FIG. 1.
Figure 3:
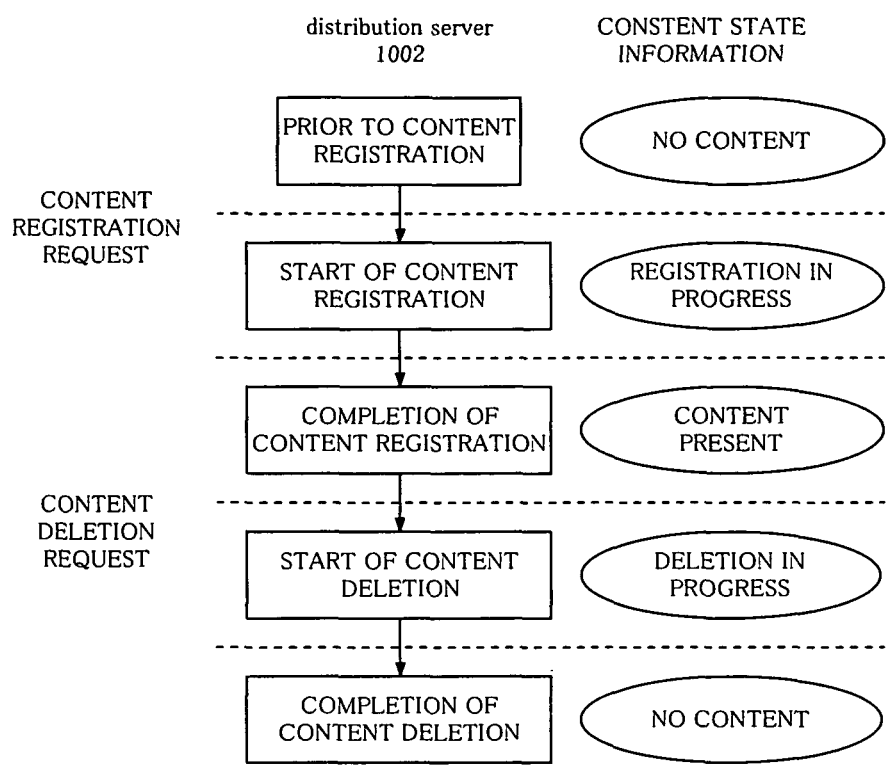
FIG. 3 is a diagram showing an example of state information stored in a state DB shown in FIG. 1.
Figure 4:
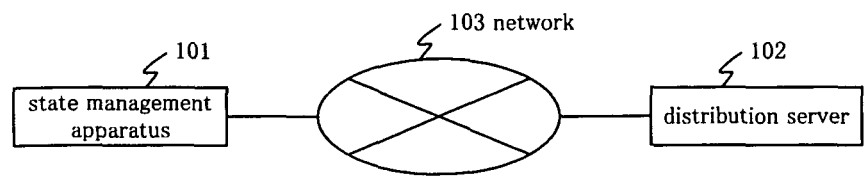
FIG. 4 is a diagram showing a first exemplary embodiment of a processing state management apparatus according to the present invention.

FIG. 4 is a diagram showing a first exemplary embodiment of a processing state management apparatus according to the present invention.

As shown in FIG. 4, the present exemplary embodiment comprises processing state management apparatus 101 according to the present invention and distribution server 102. Processing state management apparatus 101 and distribution server 102 are interconnected by network 103.

Processing state management apparatus 101 manages the processing states of distribution server 102. Specifically, processing state management apparatus 101 manages the state of a process for distribution server 102 to register content to be distributed and the state of a process for distribution server 102 to delete content to be distributed. Nothing particular will be specified here about how processing state management apparatus 101 is connected to distribution server 102.

Distribution server 102 is a contents distribution server for distributing various content such as audio data, still images, and moving images. Distribution server 102 has a content database for storing content to be distributed in distribution server 102, and executes processes (transactions) for registering/deleting content in or from the content database. Distribution server 102 downloads content to be distributed from an FTP server or a client terminal, which has content, connected to network 103, and stores the downloaded content. Distribution server 102 distributes the content stored therein via network 103 to an apparatus (not shown) connected to network 103. Nothing particular will be specified here about how distribution server 102 is connected to network 103.

Figure 5:
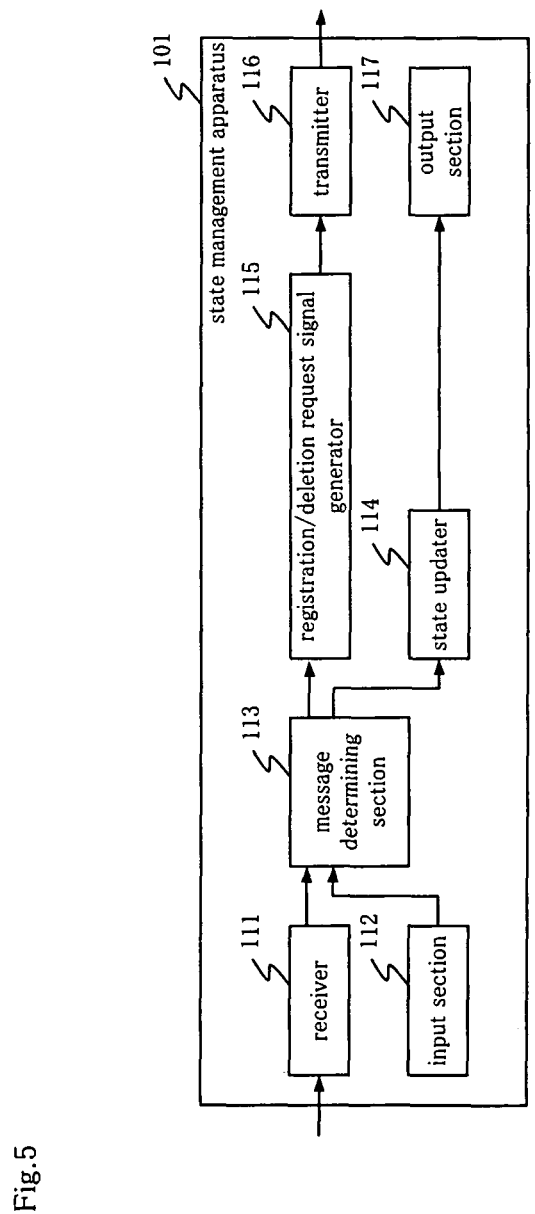
FIG. 5 is a diagram showing an internal configurational example of the processing state management apparatus shown in FIG. 4.

FIG. 5 is a diagram showing an internal configurational example of processing state management apparatus 101 shown in FIG. 4.

As shown in FIG. 5, processing state management apparatus 101 shown in FIG. 4 comprises receiver 111, input section 112, message determining section 113, state updater 114, registration/deletion request signal generator 115, transmitter 116, and output section 117.

Receiver 111 receives a signal sent via network 103 and converts the received signal into a signal format for use in processing state management apparatus 101. For example, if the protocol of a signal sent via network 103 and the protocol of a signal used in processing state management apparatus 101 are different from each other, then receiver 111 converts the communication protocol of the signal from the external protocol into the internal protocol. If processing state management apparatus 101 and network 103 are connected according to wireless technology, then receiver 111 performs general demodulating and amplifying processes for converting a wireless signal into a wired signal.

Input section 112 serves to input external information to processing state management apparatus 101. Input section 112 also converts input information into a signal that can be processed in processing state management apparatus 101. Input section 112 may have a general information input mechanism such as a keyboard, a mouse, a touch panel, a microphone, or the like.

Message determining section 113 determines what a signal (message) received and converted by receiver 111 or a signal (message) input and converted by input section 112 means. Message determining section 113 may determine the signal based on identification information which has been added thereto. There are three types of signals to be determined by message determining section 113, i.e., a "registration request message signal" input to input section 112 for requesting the registration of content in distribution server 102, a "deletion request message signal" input to input section 112 for requesting the deletion of content from distribution server 102, and a "completion response signal" sent from distribution server 102 via network 103 and received by receiver 111 and indicating that the registration/deletion process is completed. Message determining section 113 outputs a signal depending on the determined result to state updater 114 or registration/deletion request signal generator 115. The registration/deletion of content in or from distribution server 102 means the registration of content in the content database of distribution server 102 and the deletion of the content from the content database.

State updater 114 holds a processing state of distribution server 102 which is managed by processing state management apparatus 101. State updater 114 also updates the held processing state based on the signal output from message determining section 113. The updated processing state refers to the state of processes of registering and deleting content in and from distribution server 102. State updater 114 outputs an "updated information signal" representative of updated information to output section 117.

Registration/deletion request signal generator 115 is a request signal generator which generates a "registration/deletion request signal" for requesting the registration or deletion of content in or from distribution server 102, based on the signal output from message determining section 113. Registration/deletion request signal generator 115 outputs the generated registration/deletion request signal to transmitter 116.

Transmitter 116 sends the "registration/deletion request signal" output from registration/deletion request signal generator 115 via network 103 to distribution server 102. At this time, transmitter 116 converts the "registration/deletion request signal" output from registration/deletion request signal generator 115 into a format for transmission to network 103. For example, if the protocol of a signal used in processing state management apparatus 101 and the protocol of a signal sent to network 103 are different from each other, then transmitter 116 converts the communication protocol of signals from the external protocol into the internal protocol. If processing state management apparatus 101 and network 103 are connected according to wireless technology, then transmitter 116 performs a general modulating process or the like for converting a wired signal into a wireless signal.

Output section 117 outputs the "updated information signal" output from state updater 114. Output section 117 may output the "updated information signal" by displaying it on a screen or by reproducing it as sound from a speaker, so long as the person who operates processing state management apparatus 101 can recognize the "updated information". For example, if output section 117 is a display, it may display the updated information in a predetermined format on the display. If output section 117 is a speaker, it may reproduce the sound depending on the updated information.

The components shown in FIG. 5 are only those which are relevant to the present exemplary embodiment, of the components of processing state management apparatus 101.

A processing state management method in the first exemplary embodiment will be described below. First, a process that is carried out when processing state management apparatus 101 sends a request for registering/deleting content to distribution server 102 will be described below.

Figure 6:
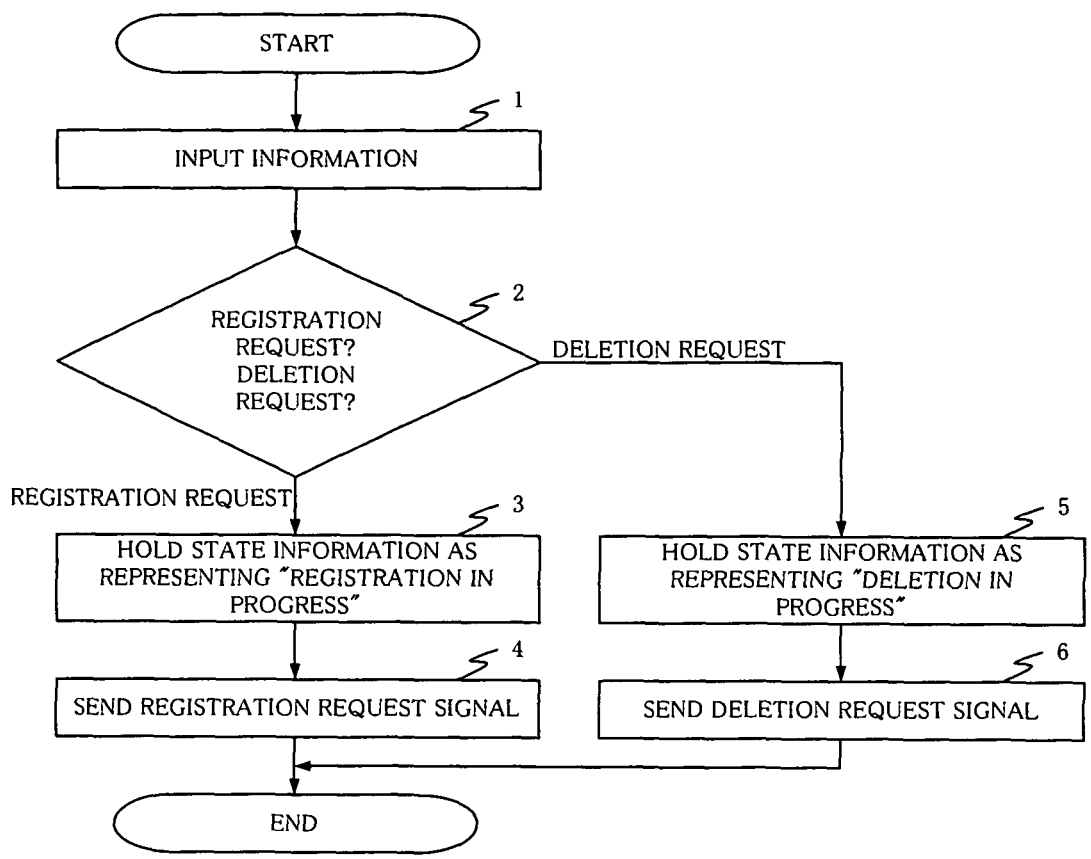
FIG. 6 is a flowchart of a processing sequence that is carried out when the processing state management apparatus sends a request for registering/deleting content to a distribution server, of a processing state management method in the configuration shown in FIGS. 4 and 5.

FIG. 6 is a flowchart of a processing sequence that is carried out when processing state management apparatus 101 sends a request for registering/deleting content to distribution server 102, of a processing state management method in the configuration shown in FIGS. 4 and 5.

When the person who operates processing state management apparatus 101 operates input section 112 to input information to input section 112 in step 1, the input information is converted into a signal that can be processed in processing state management apparatus 101. The information input to input section 112 includes content identification information which has been added to an addressed content to identify the content and information indicating whether registration or deletion of the content is requested. The converted signal is output from input section 112 to message determining section 113. At this time, inherent identification information representing whether the output signal is a "registration request message signal" for requesting the registration of the content or a "deletion request message signal" for requesting the deletion of the content may be added to the signal.

Message determining section 113 determines what the signal output from input section 112 signifies in step 2. In this case, as described above, message determining section 113 determines whether the signal is a "registration request message signal" or a "deletion request message signal", or a "completion response signal". The signal may be identified based on the identification information inherently added to the signal or a predetermined signal format or the header information of the signal. Alternatively, message determining section 113 may have a port for inputting a signal output from receiver 111 and a port for inputting a signal output from input section 112, thereby to determine whether the signal is one of two signals, i.e., a "request message signal" which may be either a "registration request message signal" or a "deletion request message signal", or a "completion response signal".

If message determining section 113 judges that the signal output from input section 112 is a "registration request message signal" in step 2, then state updater 114 holds in step 3 that the processing state of the content, to which the content identification information included in the "registration request message signal" is assigned, represents "registration in progress". The processing state is held in storage means for storing information, such as a register or the like, provided in state updater 114.

Registration/deletion request signal generator 115 generates a "registration request signal" for sending the "registration request message signal" via network 103 to distribution server 102, based on the "registration request message signal". The "registration request signal" generated by registration/deletion request signal generator 115 is sent from transmitter 116 via network 103 to distribution server 102 in step 4. If the "registration request message signal" can be recognized as a signal for requesting registration of the content in distribution server 102, then the "registration request message signal" may be sent directly (without registration/deletion request signal generator 115 generating a "registration request signal") from transmitter 116. The processing of step 3 and the processing of step 4 may be executed simultaneously.

If message determining section 113 judges that the signal output from input section 112 is a "deletion request message signal" in step 2, then state updater 114 holds in step 5 state information that the processing state of the content, to which the content identification information included in the "registration request message signal" represents "deletion in progress". The state information is held in storage means for storing information, such as a register or the like, provided in state updater 114.

Registration/deletion request signal generator 115 generates a "deletion request signal" for sending the "deletion request message signal" via network 103 to distribution server 102, based on the "deletion request message signal". The "deletion request signal" generated by registration/deletion request signal generator 115 is sent from transmitter 116 via network 103 to distribution server 102 in step 6. If the "deletion request message signal" can be recognized as a signal for requesting the deletion of the content from distribution server 102, then the "deletion request message signal" may be sent directly (without registration/deletion request signal generator 115 generating a "deletion request signal") from transmitter 116.

A process that is carried out when processing state management apparatus 101 receives a notification indicating the completion of the process of registering/deleting the content in or from distribution server 102 will be described below.

Figure 7:
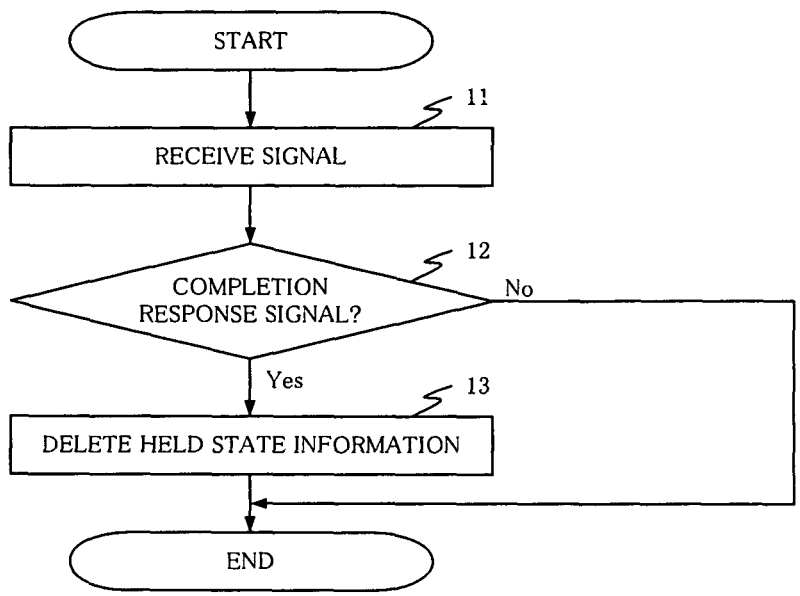
FIG. 7 is a flowchart of a processing sequence that is carried out when the processing state management apparatus receives a notification indicating the completion of a process of registering/deleting the content from the distribution server, of the processing state management method in the configuration shown in FIGS. 4 and 5.

FIG. 7 is a flowchart of a processing sequence that is carried out when processing state management apparatus 101 receives a notification indicating the completion of a process of registering/deleting the content in or from distribution server 102, of the processing state management method in the configuration shown in FIGS. 4 and 5.

When a signal sent from distribution server 102 via network 103 is received by receiver 111 in step 11, the received signal is converted into a signal that can be processed in processing state management apparatus 101. The signal received by receiver 111 includes content identification information which has been added to an addressed content to identify the content and information indicating that the process of registering or deleting the content in or from distribution server 102 is completed. The converted signal is output from receiver 111 to message determining section 113. At this time, inherent identification information representing that the output signal is a signal sent from distribution server 102 via network 103 may be added to the signal.

Message determining section 113 determines what the signal output from receiver 111 signifies in step 12. As with step 2, message determining section 113 determines whether the signal is a "registration request message signal" or a "deletion request message signal", or a "completion response signal". The signal may be identified based on the identification information inherently added to the signal or a predetermined signal format or the header information of the signal. Alternatively, message determining section 113 may have a port for inputting a signal output from receiver 111 and a port for inputting a signal output from input section 112, thereby to determine whether the signal is one of two signals, i.e., a "request message signal" which may be either a "registration request message signal" or a "deletion request message signal", or a "completion response signal".

If message determining section 113 judges that the signal output from receiver 111 is a "completion response signal", then state updater 114 deletes the state information of the contents identification information included in the "completion response signal" held by state updater 114 in step 13. The deleted state information may be output from output section 117.

Figure 8:
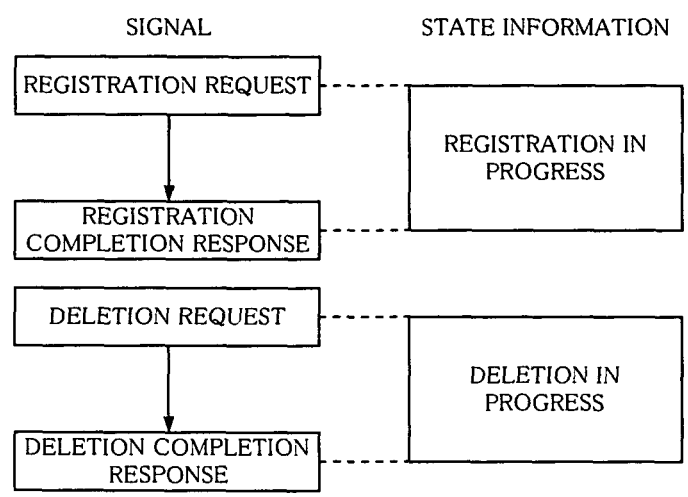
FIG. 8 is a diagram showing a state transition of state information based on a signal judged by a message determining section shown in FIG. 4.

FIG. 8 is a diagram showing a state transition of state information based on a signal judged by message determining section 113 shown in FIG. 4.

As shown in FIG. 8, after message determining section 113 has judged a "registration request message signal" until it judges a "(registration) completion response signal", state updater 114 holds "registration in progress" as representing the state information of the process of registering the content in distribution server 102. After message determining section 113 has judged a "deletion request message signal" until it judges a "(deletion) completion response signal", state updater 114 holds "deletion in progress" as representing the state information of the process of deleting the content from distribution server 102.

As described above, since the state of the process of registering/deleting the content in or from distribution server 102 is held as state information by state updater 114, processing state management apparatus 101 can manage the state of the process of registering/deleting the content in or from distribution server 102. Therefore, processing state management apparatus 101 can recognize the state of the process of registering/deleting the content in or from distribution server 102 without making an inquiry to distribution server 102. Since the state information is deleted after the process is completed, processing state management apparatus 101 does not need to hold a large amount of data.

(Second Exemplary Embodiment)

In the first exemplary embodiment, the state information may be held in a particular database.

Figure 9:
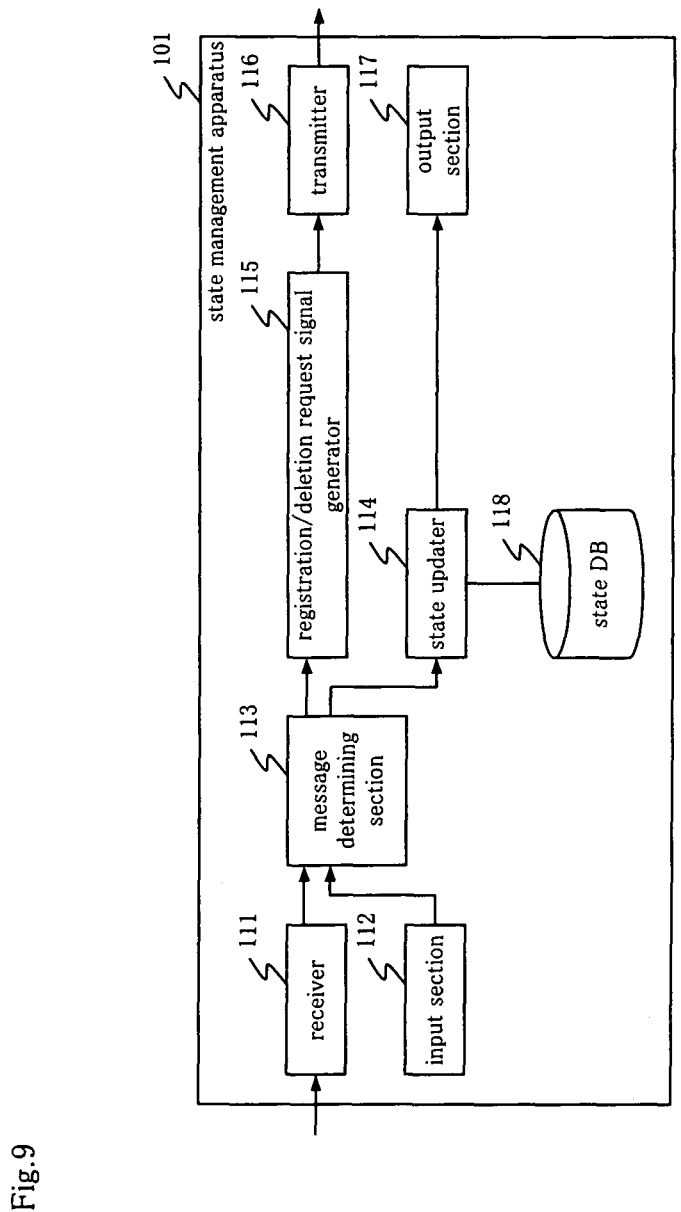
FIG. 9 is a diagram showing an internal configurational example of a processing state management apparatus according to a second exemplary embodiment of the processing state management apparatus according to the present invention.

FIG. 9 is a diagram showing an internal configurational example of a processing state management apparatus according to a second exemplary embodiment of the processing state management apparatus according to the present invention.

As shown in FIG. 9, processing state management apparatus 101 according to the second exemplary embodiment includes state DB 118 added to the configuration shown in FIG. 5.

State DB 118 is a database for storing state information held in state updater 114 in the first exemplary embodiment. Since state information is stored in state DB 118, the state information can be held in processing state management apparatus 101.

According to the present exemplary information, state updater 114 stores a processing state of distribution server 102 which is managed by processing state management apparatus 101 in state DB 118. State updater 114 also updates the state information stored in state DB 118 based on a signal output from message determining section 113. The updated processing state represents the state of processes of registering and deleting content in and from distribution server 102. State updater 114 outputs an updated information signal representing the updated information to output section 117.

FIG. 10 is a diagram showing an example of the internal configuration of state DB 118 shown in FIG. 9.

As shown in FIG. 10, the internal configuration of state DB 118 stores therein content identification information assigned to content in order to identify the content which is being registered/deleted in or from distribution server 102, and state information representative of the state of the process of registering/deleting the content in or from distribution server 102, the contents identification information and the state information being associated with each other.

For example, content identification information "A-5520" and state information "registration in progress" are associated with each other. This indicates that the content whose content identification information is "A-5520" is being presently registered in distribution server 102. The content identification information "B-0156" and the state information "deletion in progress" are associated with each other. This indicates that the content whose content identification information is "B-0156" is being presently deleted from distribution server 102. The content identification information "C-5443" and the state information "registration in progress" are associated with each other. This indicates that the content whose content identification information is "C-5443" is being presently registered in distribution server 102. The content identification information "D-4043" and the state information "registration in progress" are associated with each other. This indicates that the content whose content identification information is "D-4043" is being presently registered in distribution server 102.

A 1-bit flag may be stored as state information in state DB 118. For example, if "1" is stored as state information, it indicates that content to which there is assigned content identification information that is associated with the flag and stored is being registered in or deleted from distribution server 102.

The processing state management method in processing state management apparatus 101 having the configuration shown in FIG. 9 will be described below. First, a process that is carried out when processing state management apparatus 101 sends a request for registering/deleting a content to distribution server 102 will be described below.

Figure 11:
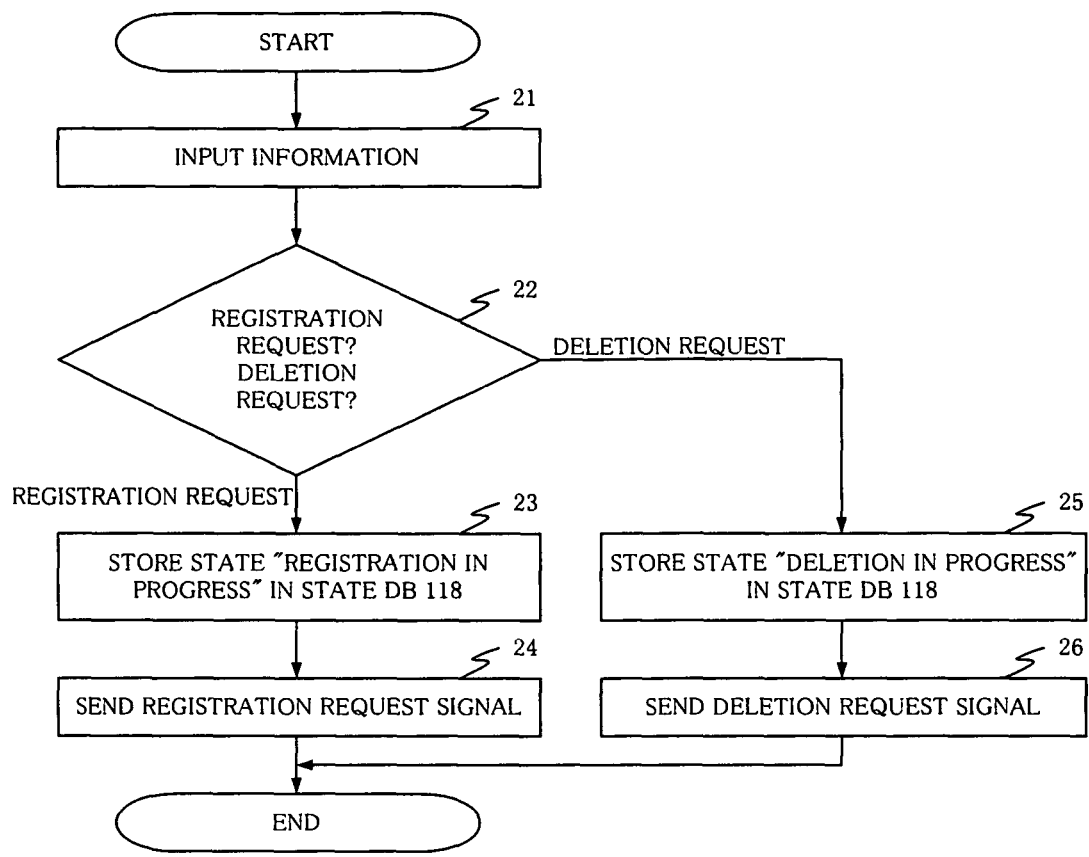
FIG. 11 is a flowchart of a processing sequence that is carried out when the processing state management apparatus sends a request for registering/deleting content to a distribution server, of a processing state management method in the configuration shown in FIGS. 4 and 9.

FIG. 11 is a flowchart of a processing sequence that is carried out when processing state management apparatus 101 sends a request for registering/deleting content to distribution server 102, of a processing state management method in the configuration shown in FIGS. 4 and 9.

When the person who operates processing state management apparatus 101 operates input section 112 to input information to input section 112 in step 21, the input information is converted into a signal that can be processed in processing state management apparatus 101. The information input to input section 112 includes content identification information which has been added to an addressed content to identify the content and information indicating whether registration or deletion of the content is requested. The converted signal is output from input section 112 to message determining section 113. At this time, inherent identification information representing whether the output signal is a "registration request message signal" for requesting the registration of the content or a "deletion request message signal" for requesting the deletion of the content may be added to the signal.

Message determining section 113 determines what the signal output from input section 112 signifies in step 22. In this case, as described above, message determining section 113 determines whether the signal is a "registration request message signal" or a "deletion request message signal", or a "completion response signal". The signal may be identified based on the identification information inherently added to the signal or a predetermined signal format or the header information of the signal. Alternatively, message determining section 113 may have a port for inputting a signal output from receiver 111 and a port for inputting a signal output from input section 112, thereby to determine whether the signal is one of two signals, i.e., a "request message signal" which may be either a "registration request message signal" or a "deletion request message signal", or a "completion response signal".

If message determining section 113 judges that the signal output from input section 112 is a "registration request message signal" in step 22, then state updater 114 stores the "registration request message signal" included in the "registration request message signal" in state DB 118. The state information is stored in association with content identification information in state DB 118 by state updater 114. In step 23, the processing state representing "registration in progress" is stored in state DB 118 by state updater 114.

Registration/deletion request signal generator 115 generates a "registration request signal" for sending the "registration request message signal" via network 103 to distribution server 102, based on the "registration request message signal". The "registration request signal" generated by registration/deletion request signal generator 115 is sent from transmitter 116 via network 103 to distribution server 102 in step 24. If the "registration request message signal" can be recognized as a signal for requesting the registration of the content in distribution server 102, then the "registration request message signal" may be sent directly (without registration/deletion request signal generator 115 generating a "registration request signal") from transmitter 116.

If message determining section 113 judges that the signal output from input section 112 is a "deletion request message signal" in step 22, then state updater 114 stores the "deletion request message signal" included in the "deletion request message signal" in state DB 118. The state information is stored in association with content identification information in state DB 118 by state updater 114. In step 25, the processing state representing "deletion in progress" is stored in state DB 118 by state updater 114.

Registration/deletion request signal generator 115 generates a "deletion request signal" for sending the "deletion request message signal" via network 103 to distribution server 102, based on the "deletion request message signal". The "deletion request signal" generated by registration/deletion request signal generator 115 is sent from transmitter 116 via network 103 to distribution server 102 in step 26. If the "deletion request message signal" can be recognized as a signal for requesting deletion of the content from distribution server 102, then the "deletion request message signal" may be sent directly (without registration/deletion request signal generator 115 generating a "deletion request signal") from transmitter 116.

A process that is carried out when processing state management apparatus 101 receives a notification indicating the completion of the process of registering/deleting the content in or from distribution server 102 will be described below.

Figure 12:
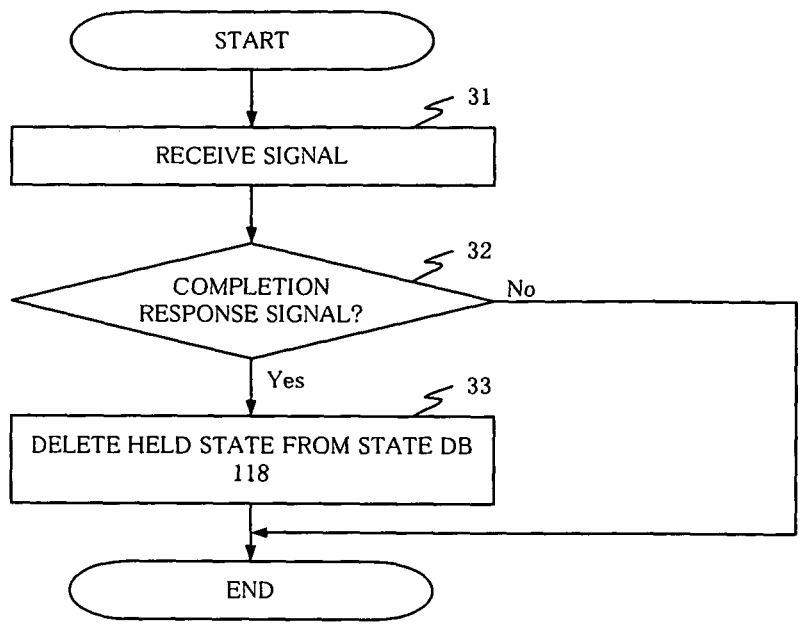
FIG. 12 is a flowchart of a processing sequence that is carried out when the processing state management apparatus receives a notification indicating the completion of a process of registering/deleting content from the distribution server, of the processing state management method in the configuration shown in FIGS. 4 and 9.

FIG. 12 is a flowchart of a processing sequence that is carried out when processing state management apparatus 101 receives a notification indicating the completion of a process of registering/deleting the content in or from distribution server 102, of the processing state management method in the configuration shown in FIGS. 4 and 9.

When a signal sent from distribution server 102 via network 103 is received by receiver 111 in step 31, the received signal is converted into a signal that can be processed in processing state management apparatus 101. The signal received by receiver 111 includes content identification information which has been added to an addressed content to identify the content and information indicating that the process of registering or deleting the content in or from distribution server 102 is completed. The converted signal is output from receiver 111 to message determining section 113. At this time, inherent identification information representing that the output signal is a signal sent from distribution server 102 via network 103 may be added to the signal.

Message determining section 113 determines what the signal output from receiver 111 signifies in step 32. As with step 22, message determining section 113 determines whether the signal is a "registration request message signal" or a "deletion request message signal", or a "completion response signal". The signal may be identified based on the identification information inherently added to the signal or a predetermined signal format or the header information of the signal. Alternatively, message determining section 113 may have a port for inputting a signal output from receiver 111 and a port for inputting a signal output from input section 112, thereby determining whether the signal is one of two signals, i.e., a "request message signal" which may be either a "registration request message signal" or a "deletion request message signal", or a "completion response signal".

If message determining section 113 judges that the signal output from receiver 111 is a "completion response signal", then state updater 114 deletes content identification information included in the "completion response signal" and state information associated with the content identification information, which are held in state DB 118, in step 33. The deleted state information may be output from output section 117.

As described above, since the state of the process of registering/deleting the content in or from distribution server 102 is held as state information by state DB 118, processing state management apparatus 101 can manage the state of the process of registering/deleting the content in or from distribution server 102. Therefore, processing state management apparatus 101 can recognize the state of the process of registering/deleting the content in or from distribution server 102 without making an inquiry to distribution server 102. Since the content identification information and the state information are deleted from state DB 118 after the process is completed, processing state management apparatus 101 does not need to hold a large amount of data.

(Third Exemplary Embodiment)

A user device owned by a user who uses content distribution may send a request for registration/deletion to distribution server 102. The user device may also be able to confirm state information held by processing state management apparatus 101.

Figure 13:
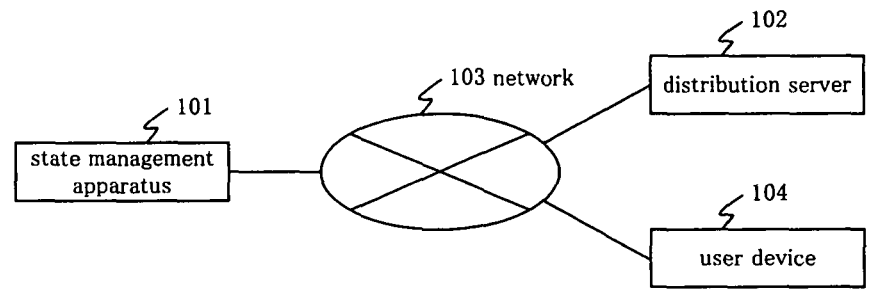
FIG. 13 is a diagram showing a third exemplary embodiment of the processing state management apparatus according to the present invention.

FIG. 13 is a diagram showing a third exemplary embodiment of the processing state management apparatus according to the present invention.

According to the present exemplary embodiment, as shown in FIG. 13, user device 104 is connected via network 103 to processing state management apparatus 101 and distribution server 102.

User device 104 is a terminal device owned by a user who uses content distribution of distribution server 102, and may be a device having a communication function such as a general PC (Personal Computer), mobile terminal, or the like.

Figure 14:
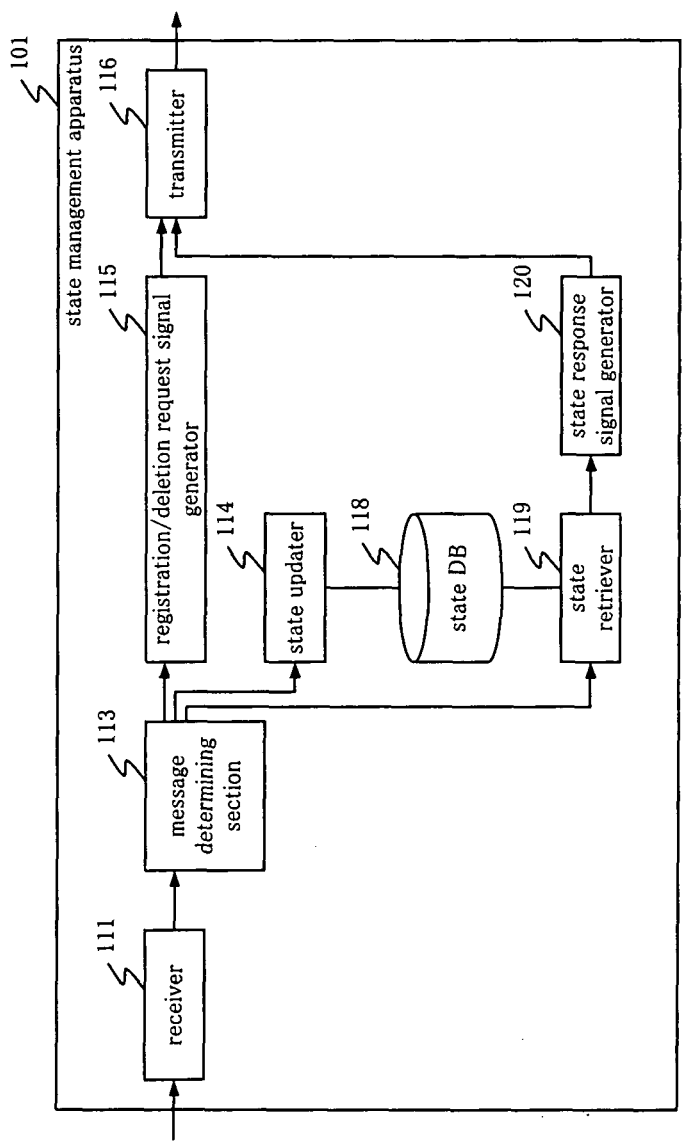
FIG. 14 is a diagram showing an internal configurational example of the processing state management apparatus shown in FIG. 13.

FIG. 14 is a diagram showing an internal configurational example of processing state management apparatus 101 shown in FIG. 13.

As shown in FIG. 14, processing state management apparatus 101 according to the third exemplary embodiment includes state retriever 119 and state response signal generator 120 added to the configuration shown in FIG. 9. Though the configuration shown in FIG. 14 is free of input section 112 and output section 117 shown in FIG. 9, it may include input section 112 and output section 117.

Receiver 111 is identical to receiver 111 shown in FIG. 9.

Message determining section 113 determines what a signal (message) received and converted by receiver 111 or a signal (message) input and converted by input section 112 means. Message determining section 113 may determine the signal based on identification information which has been added thereto. There are four types of signals to be determined by message determining section 113, i.e., a "registration request message signal" sent from user device 104 via network 103 for requesting the registration of content in distribution server 102, a "deletion request message signal" sent from user device 104 via network 103 for requesting the deletion of content from distribution server 102, a "state information confirmation signal" sent from user device 104 via network 103 for confirming the state information of content, and a "completion response signal" sent from distribution server 102 via network 103 and indicating that a registration/deletion process is completed. Message determining section 113 outputs a signal depending on the determined result to state updater 114 or registration/deletion request signal generator 115 or state retriever 119.

State updater 114 stores a processing state of distribution server 102 which is managed by processing state management apparatus 101 in state DB 118. State updater 114 also updates the state information stored in state DB 118 based on a signal output from message determining section 113. The updated processing state represents the state of processes of registering and deleting content in and from distribution server 102.

Registration/deletion request signal generator 115 is identical to registration/deletion request signal generator 115 shown in FIG. 9.

State DB 118 is identical to state DB 118 shown in FIG. 9.

Based on the signal output from message determining section 113, state retriever 119 retrieves the state information of the corresponding content from state DB 118.

State response signal generator 120 generates a "state response signal" which is a response signal to a "state information confirmation signal" based on the result retrieved by state retriever 119, and outputs the generated "state response signal" to transmitter 116.

Transmitter 116 sends the "registration/deletion request signal" output from registration/deletion request signal generator 115 via network 103 to distribution server 102. Transmitter 116 also sends the "state response signal" output from state response signal generator 120 via network 103 to user device 104. At this time, transmitter 116 converts the "registration/deletion request signal" output from registration/deletion request signal generator 115 and the "state response signal" output from state response signal generator 120 into a format for transmission to network 103. For example, if the protocol of a signal used in processing state management apparatus 101 and the protocol of a signal sent to network 103 are different from each other, then transmitter 116 converts the communication protocol of signals from the external protocol into the internal protocol. If processing state management apparatus 101 and network 103 are connected according to wireless technology, then transmitter 116 performs a general modulating process or the like for converting a wired signal into a wireless signal.

The components shown in FIG. 14 are only those which are relevant to the present exemplary embodiment, of the components of processing state management apparatus 101.

A processing state management method in the configuration shown in FIGS. 13 and 14 will be described below.

Figure 15:
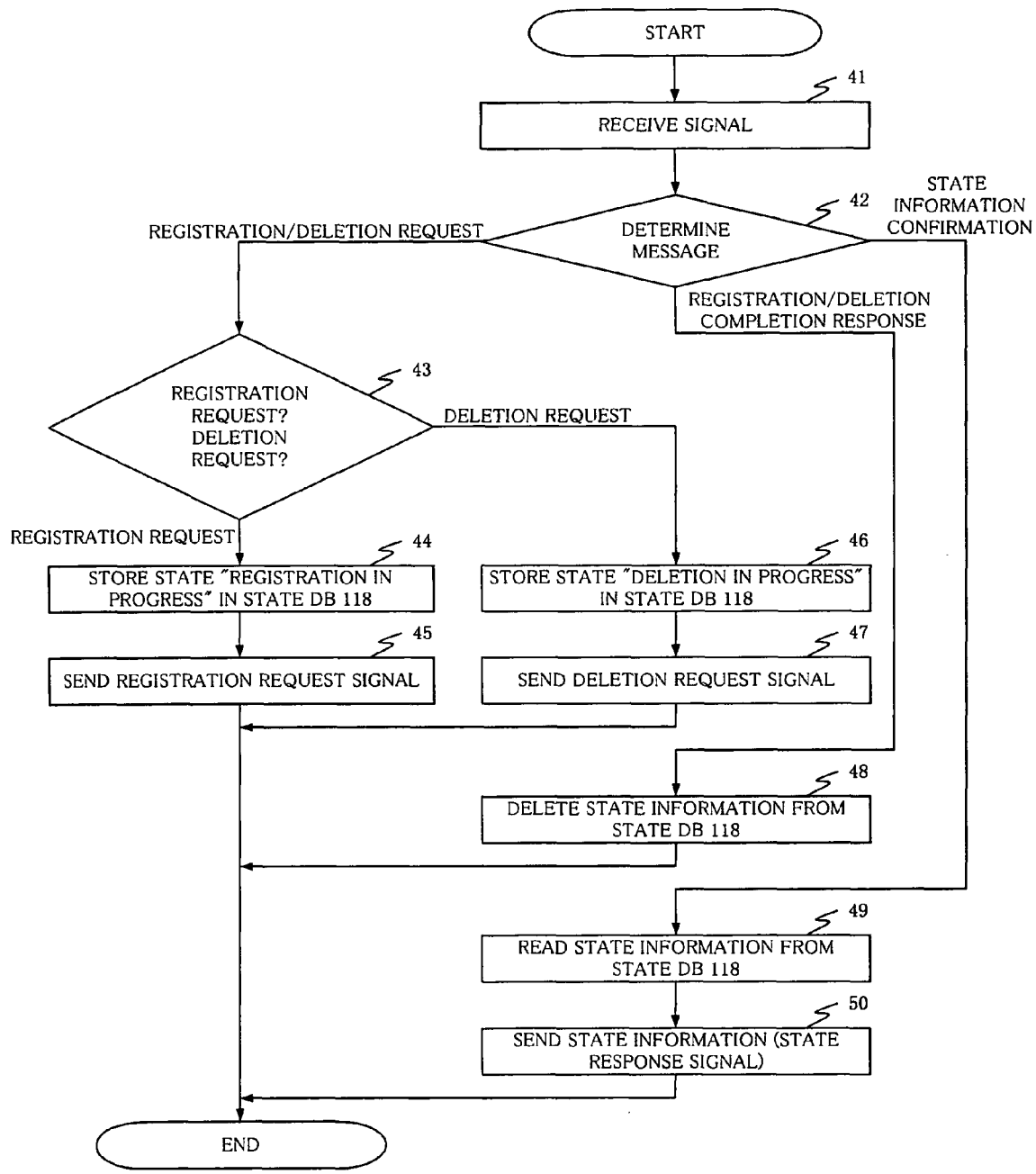
FIG. 15 is a flowchart of a processing state management method in the configuration shown in FIGS. 13 and 14.

FIG. 15 is a flowchart which is illustrative of a processing state management method in the configuration shown in FIGS. 13 and 14.

When a signal sent from distribution server 102 or user device 104 via network 103 is received by receiver 111 in step 41, the received signal is converted into a signal that can be processed in processing state management apparatus 101. Receiver 111 may identify which of distribution server 102 and user device 104 has sent the received signal, and add the identified result to the signal. The converted signal is output from receiver 111 to message determining section 113.

Message determining section 113 determines what the signal output from receiver 111 signifies in step 42. As described above, message determining section 113 determines whether the signal is a "registration request message signal" or a "deletion request message signal", or a "state information confirmation signal", or a "completion response signal". The signal may be identified based on the identification information inherently added to the signal or a predetermined signal format or the header information of the signal.

If message determining section 113 judges that the signal output from receiver 111 is a "registration request message signal" or a "deletion request message signal", then message determining section 113 determines whether the signal is a "registration request message signal" or a "deletion request message signal" in step 43.

If message determining section 113 judges that the signal output from receiver 111 is a "registration request message signal" in step 43, then contents identification information included in the "registration request message signal" is stored in state DB 118 by state updater 114. State information is associated with the contents identification information and stored in state DB 118 by state updater 114. In step 44, the processing state representing "registration in progress" is stored into state DB 118 by state updater 114.

Registration/deletion request signal generator 115 generates a "registration request signal" for sending the "registration request message signal" via network 103 to distribution server 102, based on the "registration request message signal". The "registration request signal" generated by registration/deletion request signal generator 115 is sent from transmitter 116 via network 103 to distribution server 102 in step 45. If the "registration request message signal" can be recognized as a signal for requesting registration of the content in distribution server 102, then the "registration request message signal" may be sent directly (without registration/deletion request signal generator 115 generating a "registration request signal") from transmitter 116.

If message determining section 113 judges that the signal output from receiver 111 is a "deletion request message signal" in step 43, then content identification information included in the "deletion request message signal" is stored in state DB 118 by state updater 114. State information is associated with the content identification information and is stored in state DB 118 by state updater 114. In step 46, the processing state representing "deletion in progress" is stored in state DB 118 by state updater 114.

Registration/deletion request signal generator 115 generates a "deletion request signal" for sending the "deletion request message signal" via network 103 to distribution server 102, based on the "deletion request message signal". The "deletion request signal" generated by registration/deletion request signal generator 115 is sent from transmitter 116 via network 103 to distribution server 102 in step 47. If the "deletion request message signal" can be recognized as a signal for requesting deletion of the content from distribution server 102, then the "deletion request message signal" may be sent directly (without registration/deletion request signal generator 115 generating a "deletion request signal") from transmitter 116.

If message determining section 113 judges that the signal output from receiver 111 is a "completion response signal", then state updater 114 deletes content identification information included in the "completion response signal" and state information associated with the content identification information, which are held in state DB 118, in step 33.

If message determining section 113 judges that the signal output from receiver 111 is a "state information confirmation signal" in step 42, then state retriever 119 extracts contents identification information from the "state information confirmation signal". State information corresponding to the extracted contents identification information is read from state DB 118 in step 49. Based on the read state information, state response signal generator 120 generates a "state response signal" for sending the state information via network 103 to user device 104. The "state response signal" generated by state response signal generator 120 is sent from transmitter 116 via network 103 to user device 104 in step 50.

As described above, since the state of the process of registering/deleting content in or from distribution server 102 is held as state information by state DB 118, processing state management apparatus 101 can manage the state of the process of registering/deleting the content in or from distribution server 102. Therefore, when user device 104 sends a request for confirming the state of the process of registering/deleting desired content in or from distribution server 102, processing state management apparatus 101 can send a response to user device 104 without making an inquiry to distribution server 102 about the state of the process. Since the contents identification information and the state information are deleted after the process is completed, processing state management apparatus 101 does not need to hold a large amount of data.

(Fourth Exemplary Embodiment)

If the state information of desired content is not stored in state DB 108, a request for confirming the state of a process on the content may be sent to distribution server 102.

Figure 16:
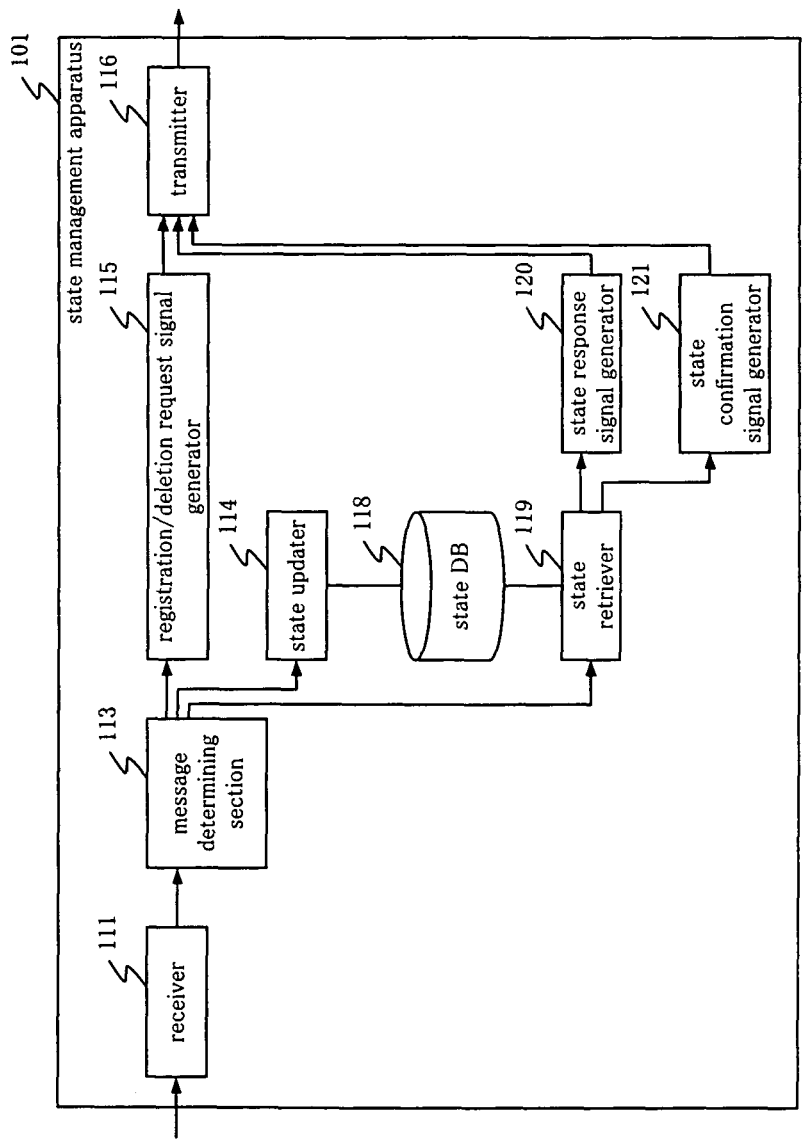
FIG. 16 is a diagram showing an internal configurational example of a processing state management apparatus according to a fourth exemplary embodiment of the processing state management apparatus according to the present invention.

FIG. 16 is a diagram showing an internal configurational example of processing state management apparatus 101 according to a fourth exemplary embodiment of the processing state management apparatus according to the present invention.

As shown in FIG. 16, processing state management apparatus 101 according to the fourth exemplary embodiment includes state confirmation signal generator 121 added to the configuration shown in FIG. 14.

Receiver 111 is identical to receiver 111 shown in FIG. 14.

Message determining section 113 is identical to message determining section 113 shown in FIG. 14.

State updater 114 is identical to state updater 114 shown in FIG. 14.

Registration/deletion request signal generator 115 is identical to registration/deletion request signal generator 115 shown in FIG. 14.

State DB 118 is identical to state DB 118 shown in FIG. 14.

State response signal generator 120 is identical to state response signal generator 120 shown in FIG. 14.

Based on a signal output from message determining section 113, state retriever 119 retrieves the state information of the corresponding content from state DB 118. If the state information of the corresponding content is not stored in state DB 118, then state retriever 119 outputs contents identification information of the corresponding content to state confirmation signal generator 121.

Based on content identification information output from state retriever 119, state confirmation signal generator 121 generates a "state confirmation signal" which is a signal requesting the confirmation of a process of registering/deleting the content in or from distribution server 102. State confirmation signal generator 121 outputs the generated "state confirmation signal" to transmitter 116.

Transmitter 116 sends a "registration/deletion request signal" output from registration/deletion request signal generator 115 via network 103 to distribution server 102. Transmitter 116 also sends a "state response signal" output from state response signal generator 120 via network 103 to distribution server 102. Transmitter 116 also sends the "state confirmation signal" output from state confirmation signal generator 121 via network 103 to distribution server 102. At this time, transmitter 116 converts the "registration/deletion request signal" output from registration/deletion request signal generator 115, "state confirmation signal" output from state confirmation signal generator 121, and the "state response signal" output from state response signal generator 120 into a format for the transmission to network 103. For example, if the protocol of a signal used in processing state management apparatus 101 and the protocol of a signal sent to network 103 are different from each other, then transmitter 116 converts the communication protocol of signals from the external protocol into the internal protocol. If processing state management apparatus 101 and network 103 are connected according to wireless technology, then transmitter 116 performs a general modulating process or the like for converting a wired signal into a wireless signal.

The components shown in FIG. 16 are only those which are relevant to the present exemplary embodiment, of the components of processing state management apparatus 101.

A processing state management method in the configuration shown in FIGS. 13 and 16 will be described below.

Figure 17:
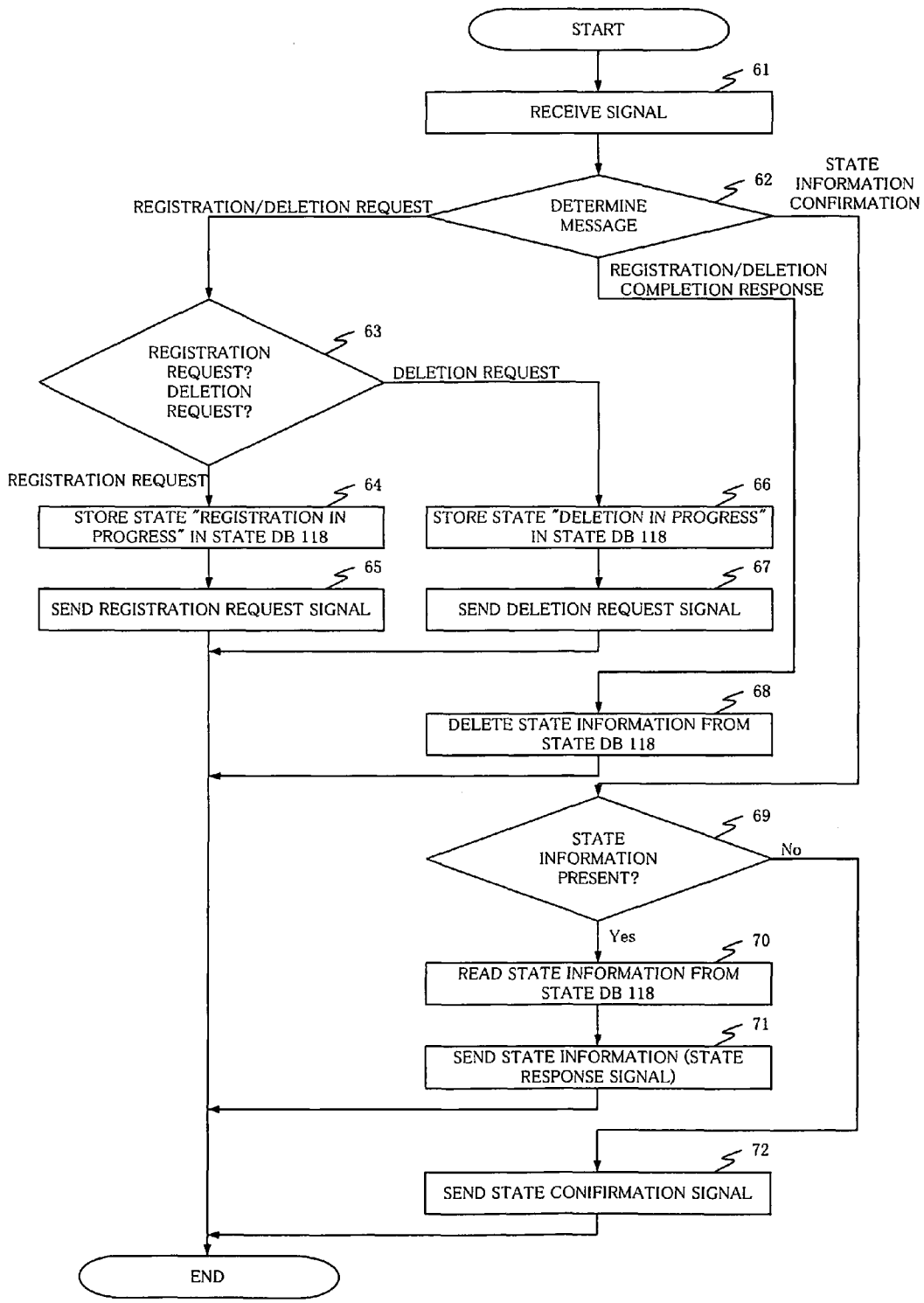
FIG. 17 is a flowchart of a processing state management method in the configuration shown in FIGS. 13 and 16.

FIG. 17 is a flowchart which is illustrative of a processing state management method in the configuration shown in FIGS. 13 and 16.

The processing of steps 61 through 68 is identical to the process of steps 41 through 68, respectively, described with reference to the flowchart shown in FIG. 15.

If message determining section 113 judges that the signal output from receiver 111 is a "state information confirmation signal" in step 62, then state retriever 119 extracts contents identification information from the "state information confirmation signal". It is then determined in step 69 whether state information corresponding to the extracted contents identification information is present in state DB 118 or not.

If it is judged in step 69 that state information corresponding to the contents identification information included in the "state information confirmation signal" is present in state DB 118, then the state information is read from state DB 118 in step 70. Based on the read state information, state response signal generator 120 generates a "state response signal" for sending the state information via network 103 to user device 104. The "state response signal" generated by state response signal generator 120 is sent from transmitter 116 via network 103 to user device 104 in step 71.

If it is judged in step 69 that state information corresponding to the contents identification information included in the "state information confirmation signal" is not present in state DB 118, then state retriever 119 outputs contents identification information of the corresponding content to state confirmation signal generator 121. State confirmation signal generator 121 then generates a "state confirmation signal" for confirming the state of a process on the content to which the contents identification information is added, in distribution server 102. The generated "state confirmation signal" is output from state confirmation signal generator 121 to transmitter 116, which sends the "state confirmation signal" via network 103 to distribution server 102. The "state confirmation signal" sent to distribution server 102 may include a request for distribution server 102 to send a response to the "state confirmation signal" to user terminal 104.

As described above, since the state of the process of registering/deleting the content in or from distribution server 102 is held as state information by state DB 118, processing state management apparatus 101 can manage the state of the process of registering/deleting the content in or from distribution server 102. Therefore, when user device 104 sends a request for confirming the state of the process of registering/deleting a desired content in or from distribution server 102, processing state management apparatus 101 can send a response to user device 104 without making an inquiry to distribution server 102 about the state of the process. If the state of a process on a desired content is not present in state DB 118, then processing state management apparatus 101 can make an inquiry to distribution server 102.

The state representing "registration in progress" or "deletion in progress" in the first through fourth exemplary embodiments may be held or stored as "processing in progress".

The processing sequence of processing state management apparatus 101 in the above first through fourth exemplary embodiments may be carried out by logic circuits that are fabricated depending on any purposes. Alternatively, a program that is descriptive of the process contents may be recorded in a recording medium that is readable by processing state management apparatus 101, reading the recorded program into processing state management apparatus 101, and executing the read program. The recording medium readable by processing state management apparatus 101 includes removable recording mediums such as a floppy disk (registered trademark), a magnetooptical disk, a DVD, a CD, etc., and HDDs or the like incorporated in processing state management apparatus 101. Furthermore, the program recorded in the recording medium is read by a CPU (not shown) in processing state management apparatus 101, and a processing sequence similar to the above processing sequence is carried out under the control of the CPU. The CPU operates as a computer for executing the program which is read from the recording medium where the program is recorded.

The present invention has been described above in reference to the exemplary embodiments. However, the present invention is not limited to the above exemplary embodiments. Rather, various changes that can be understood by those skilled in the art within the scope of the invention may be made to the arrangements and details of the present invention.

The present application is based upon and claims the benefit of priority from Japanese patent application No. 2008-047600, filed on Feb. 28, 2008, the disclosure of which is incorporated herein in its entirety, by reference.

The invention claimed is:

1. A processing state management apparatus to be connected to a distribution server that carries out a transaction to register or delete content to be distributed, said processing state management apparatus comprising:
    a transmitter which transmits a request requesting said distribution server to carry out said transaction; and
    a state updater which, after said processing state management apparatus has requested said distribution server to carry out said transaction, holds state information indicative of the state of the transaction in said distribution server as representing processing in progress until said processing state management apparatus receives a notification of completion of said transaction from said distribution server.

2. The processing state management apparatus according to claim 1, further comprising:
    a request signal generator that generates a request signal to request said distribution server to carry out said transaction,
    wherein the transmitter sends the request signal generated by said request signal generator to said distribution server, and
    wherein the state updater stores said state information as representing processing in progress in a state database of the processing state management apparatus after said transmitter has sent said request signal to said distribution server until said state updater receives the notification of completion of said transaction from said distribution server.

3. The processing state management apparatus according to claim 2, wherein said state updater stores content identification information which has been added to identify the content to be processed by said transaction, in association with said state information in said state database.

4. The processing state management apparatus according to claim 2, wherein said request signal generator generates a request signal to request said distribution server to carry out a transaction to register said content in a content database of said distribution server; and
    said state updater stores said state information as representing registration in progress after said transmitter has sent said request signal to said distribution server until said state updater receives a notification of completion of said transaction from said distribution server.

5. The processing state management apparatus according to claim 2, wherein said request signal generator generates a request signal to request said distribution server to carry out a transaction to delete said content from a content database of said distribution server; and
    said state updater stores said state information as representing deletion in progress after said transmitter has sent said request signal to said distribution server until said state updater receives a notification of completion of said transaction from said distribution server.

6. The processing state management apparatus according to claim 3, wherein said state updater stores a predetermined flag in association with said contents identification information in said state database after said transmitter has sent said request signal to said distribution server until said state updater receives the notification of completion of said transaction from said distribution server.

7. The processing state management apparatus according to claim 3, further comprising:
- a state retriever that retrieves said state information from said state database based on a state information confirmation signal to request confirmation of said state information when the state information confirmation signal is received from a user device which is connected to the processing state management apparatus; and
- a state response signal generator that generates a state response signal to send the state information retrieved by said state retriever to said user device;
- wherein said transmitter sends the state response signal generated by said state response signal generator to said user device.

8. The processing state management apparatus according to claim 7, wherein said state retriever extracts said contents identification information from said state information confirmation signal and retrieves said state information from said state database based on the extracted contents identification information.

9. The processing state management apparatus according to claim 8, further comprising:
- a state confirmation signal generator that generates a state confirmation signal to confirm a processing state of content to which said contents identification information has been added if said state information depending on said contents identification information is not present in said state database;
- wherein said transmitter sends the state confirmation signal generated by said state confirmation signal generator to said distribution server.

10. A processing state management method that manages the state of a transaction in which a distribution server is requested to carry out registering or deleting content to be distributed, comprising:
- generating a request signal to request said distribution server to carry out said transaction;
- sending said request signal to said distribution server; and
- holding state information indicative of the state of the transaction in said distribution server as representing processing in progress after said request signal has been sent to said distribution server until a notification of completion of said transaction is received from said distribution server.

11. The processing state management method according to claim 10, further comprising:
- holding content identification information which has been added to identify the content to be processed by said transaction, in association with said state information.

12. The processing state management method according to claim 10, further comprising:
- generating a request signal to request said distribution server to carry out a transaction to register said content in a content database of said distribution server; and
- storing said state information as representing registration in progress after said request signal has been sent to said distribution server until notification of completion of said transaction is received from said distribution server.

13. The processing state management method according to claim 10, further comprising:
- generating a request signal to request said distribution server to carry out a transaction to delete said content from a content database of said distribution server, and
- storing said state information as representing deletion in progress after said request signal has been sent to said distribution server until a notification of completion of said transaction is received from said distribution server.

14. The processing state management method according to claim 11, further comprising:
- holding a predetermined flag in association with said content identification information after said request signal has been sent to said distribution server until the notification of completion of said transaction is received from said distribution server.

15. The processing state management method according to claim 11, further comprising:
- retrieving the held state information based on a state information confirmation signal to request a confirmation of said state information when the state information confirmation signal is received from a user device which is owned by a user;
- generating a state response signal to send the retrieved state information to said user device; and
- sending the state response signal to said user device.

16. The processing state management method according to claim 15, further comprising:
- extracting said contents identification information from said state information confirmation signal; and
- retrieving the held state information based on the extracted contents identification information.

17. The processing state management method according to claim 16, further comprising:
- generating a state confirmation signal to confirm a processing state of the content to which said contents identification information has been added if said state information depending on said contents identification information is not held; and
- sending said state confirmation signal to said distribution server.

18. A recording medium storing a program that enables a processing state management apparatus which manages the state of a transaction which a distribution server is requested to carry out registering or deleting content to be distributed, to execute:
- a sequence to generate a request signal to request said distribution server to carry out said transaction;
- a sequence to send said request signal to said distribution server; and
- a sequence to hold state information indicative of the state of the transaction in said distribution server as representing processing in progress after said request signal has been sent to said distribution server until a notification of completion of said transaction is received from said distribution server.

19. The recording medium according to claim 18, storing a program which enables the processing state management apparatus to execute:
- a sequence to store said state information as representing processing in progress in a state database of the processing state management apparatus after said request signal has been sent to said distribution server until the notification of completion of said transaction is received from said distribution server.

20. The recording medium according to claim 19, storing a program which enables the processing state management apparatus to execute:
- a sequence to store content identification information which has been added to identify the content to be processed by said transaction, in association with said state information in said state database.

21. The recording medium according to claim 19, storing a program which enables the processing state management apparatus to execute:
- a sequence to generate a request signal to request said distribution server to carry out a transaction to register said content in a content database of said distribution server; and
- a sequence to store said state information as representing registration in progress after said request signal has been sent to said distribution server until a notification of completion of said transaction is received from said distribution server.

22. The recording medium according to any one of claim 19, storing a program which enables the processing state management apparatus to execute:
- a sequence to generate a request signal to request said distribution server to carry out a transaction to delete said content from a content database of said distribution server; and
- a sequence to store said state information as representing deletion in progress after said request signal has been sent to said distribution server until a notification of completion of said transaction is received from said distribution server.

23. The recording medium according to claim 20, storing a program which enables the processing state management apparatus to execute:
- a sequence to store a predetermined flag in association with said content identification information in said state database after said request signal has been sent to said distribution server until the notification of completion of said transaction is received from said distribution server.

24. The recording medium according to claim 20, storing a program which enables the processing state management apparatus to execute:
- a sequence to retrieve said state information from said state database based on a state information confirmation signal to request confirmation of said state information when the state information confirmation signal is received from a user device which is owned by a user;
- a sequence to generate a state response signal to send the retrieved state information to said user device; and
- a sequence to send said state response signal to said user device.

25. The recording medium according to claim 24, storing a program which enables the processing state management apparatus to execute:
- a sequence to extract said contents identification information from said state information confirmation signal; and
- a sequence to retrieve said state information based on the extracted contents identification information.

26. The recording medium according to claim 25, storing a program which enables the processing state management apparatus to execute:
- a sequence to generate a state confirmation signal to confirm a processing state of the content to which said content identification information has been added if said state information depending on said contents identification information is not present in said state database; and
- a sequence to send said state confirmation signal to said distribution server.

* * * * *